Oct. 10, 1961    J. R. PALM    3,003,270
COMBINATION MAP HOLDER AND AUTOMOBILE VISOR
Filed May 3, 1957    2 Sheets-Sheet 1
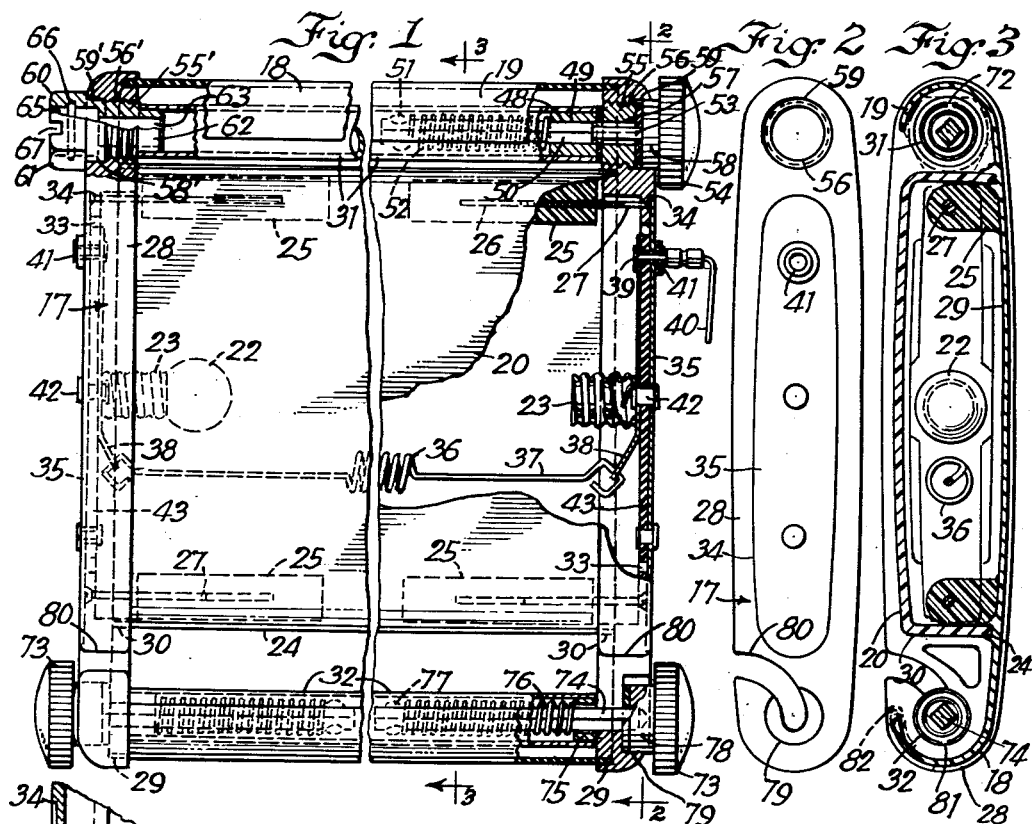
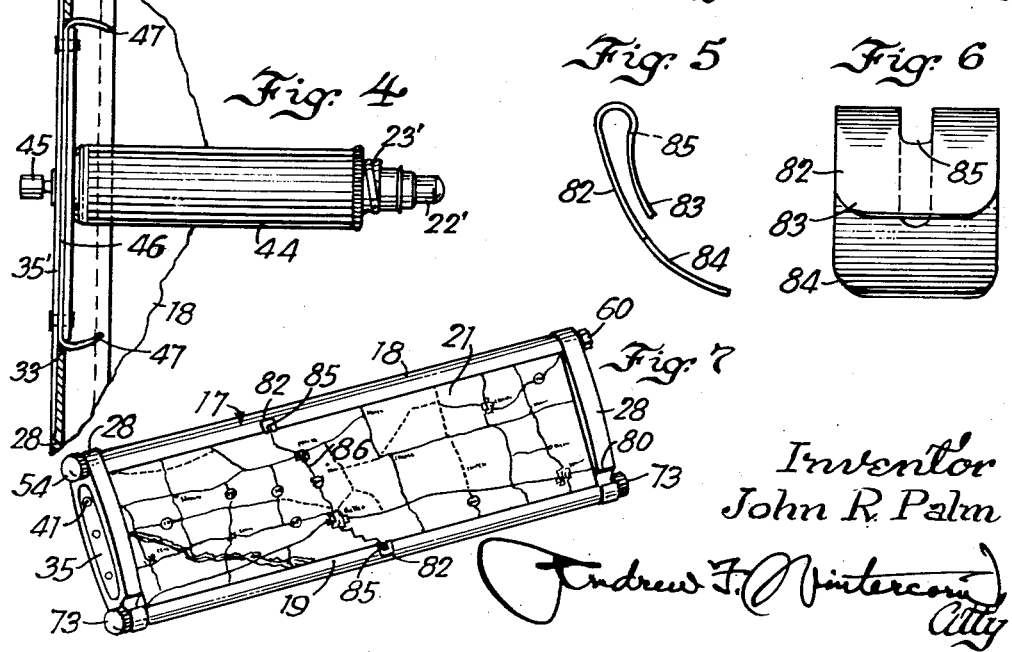
Inventor
John R. Palm

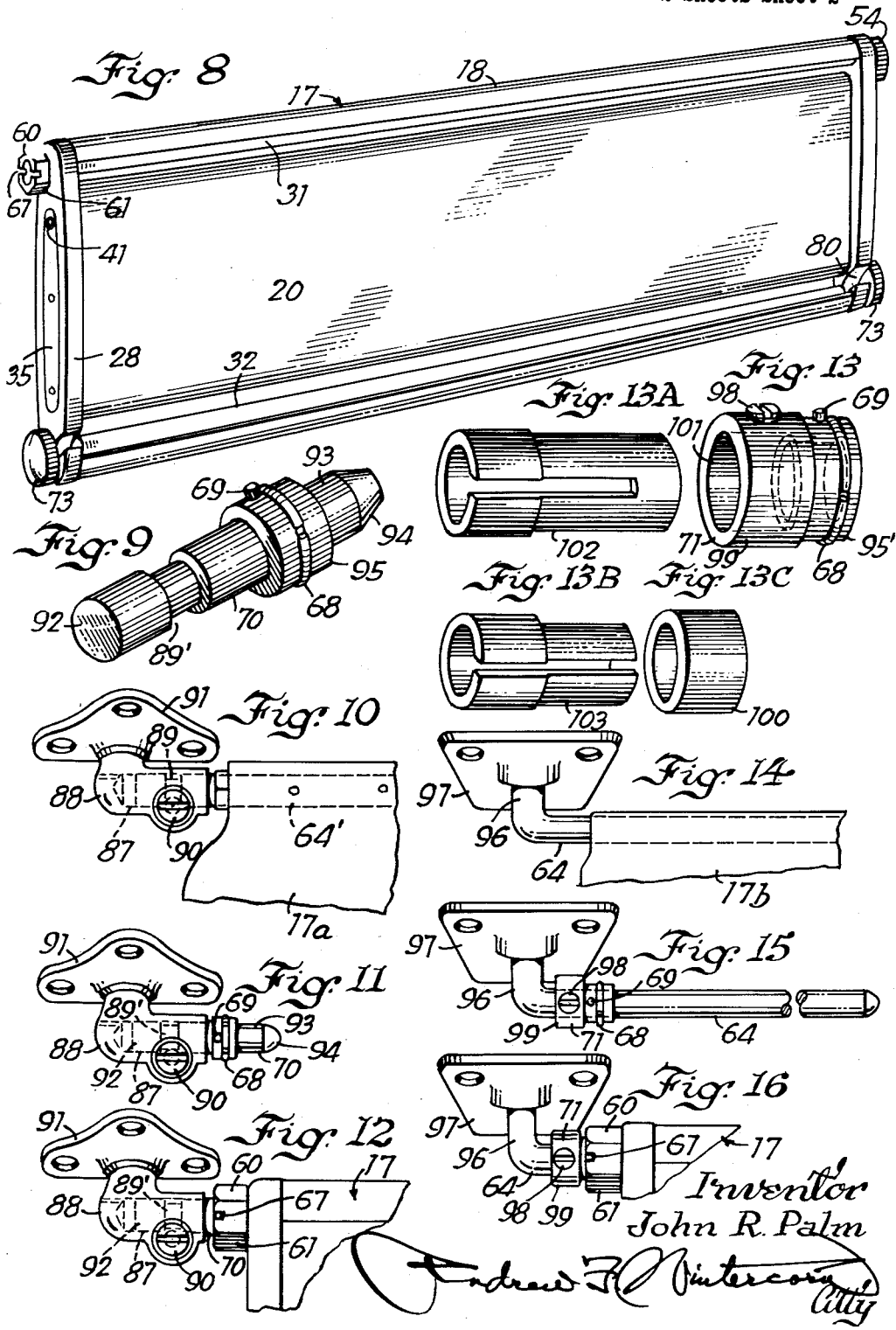

United States Patent Office 3,003,270
Patented Oct. 10, 1961

3,003,270
COMBINATION MAP HOLDER AND
AUTOMOBILE VISOR
John R. Palm, 1718 East Gate Parkway, Rockford, Ill.
Filed May 3, 1957, Ser. No. 656,798
21 Claims. (Cl. 40—86)

This invention relates to a combination map holder and automobile visor for use behind and above the windshield, the invention being particularly concerned with improvements on the construction disclosed in my copending application Serial No. 382,763, filed September 28, 1953, and which became Patent No. 2,853,817 on September 30, 1958.

In accordance with the present invention the following improvements have been added:

(1) The provision in connection with the upper roller for the map of two bushings threadable interchangeably in holes provided in the opposite ends of the unit for right or left hand mounting of the visor, the one bushing being designed for support of one end of the roller and as part of the connection with the adjustable visor mount in the automobile, and the other bushing being threadable into or out of place by means of a square portion on the stem of a spring-loaded knob, which is normally held in by spring pressure in its operative position where the square portion of the stem turns the roller while a round portion of the stem turns relative to the bushing, the knob being however retractable against spring pressure relative to the roller to enter the square portion of the stem in the square bore in the bushing to permit use of the knob as a wrench to thread the bushing in or out.

(2) The provision of a universally adaptable mounting assembly which not only enables easy application of the device to all makes of cars but is also designed to enable quick detachability of the unit and just as quick replacement and locking thereof in place on the mounting, so that maps may be changed more readily.

(3) The provision of plastic extrusions for the generally channel shaped body and map support parts, which enables quantity production of these map visors in better quality and at the right weight at the lowest manufacturing cost, while at the same time enabling making the units in different widths, if desired, without adding any manufacturing problems, a special feature being the fusing in the opposite ends of the plastic body part of blocks of plastic material to which the metallic end pieces of the unit can be fastened, whereby to avoid any noticeable changes in the ease of operation of the rollers due to expansion and contraction of the elongated body of the device with temperature change.

(4) The sockets for the light bulbs used for illumination of the map are carried on plates fitting in recesses provided therefor in the end pieces and forming closures for openings provided in said end pieces, so that easy access may be had to the light bulbs for replacement thereof, these plates being held in place by a tension spring stretched therebetween longitudinally of and inside the unit serving also as an electrical connection between the ungrounded sides of said sockets.

(5) The provision of plates similar to the ones last mentioned having means for detachably securing the same to the end pieces and serving as supports for small flashlight cases with light bulbs mounted in sockets threaded in the outer ends thereof and each arranged to be switched on or off by a switch operable from the outside of the plate, thus avoiding the necessity for running a wire from the map holder to the car battery and providing a separate switch at some convenient place intermediate the ends of this electrical connection.

(6) The provision of location pointers slidable on their resilient friction mountings on the curved edge portions of the body adjacent the rollers at the top and bottom of the map holder to mark the ends of as much of a selected route as is visible at any given time to help toward easier and faster reading of the map.

The invention is illustrated in the accompanying drawings, in which:

FIG. 1 is a rear view of a combination map holder and automobile visor made in accordance with my invention, a large intermediate portion of its length being broken away to enable showing the parts on a larger scale, and the map being also omitted in order to show the rollers and other parts that would otherwise be hidden, and certain portions of the device being shown in section to better illustrate the construction;

FIG. 2 is an end view on line 2—2 of FIG. 1 with the rollers and their knobs omitted;

FIG. 3 is a cross-section on line 3—3 of FIG. 1;

FIG. 4 is a fragmentary detail partly in section and partly in elevation showing an alternative construction wherein the illumination of the map is obtained with flashlights demountably supported in the opposite ends of the unit;

FIGS. 5 and 6 are an edgewise view and a face view of one of the locating pointers shown in use on the unit in FIG. 7 and indicated in dotted lines on the lower portion of FIG. 3;

FIG. 8 is a perspective view of the unit on a larger scale with the map removed;

FIG. 9 is a perspective view of an adapter plug for use in mounting the unit of FIG. 8 on the type of swivel support shown in FIG. 10 when the conventional visor illustrated there is removed;

FIG. 11 is a view of the swivel support of FIG. 10 with adapter of FIG. 9 applied thereto;

FIG. 12 shows the visor of FIG. 8 applied to the assembly of FIG. 11;

FIG. 13 shows another adapter designed for use with another style of visor like that shown in FIG. 14 with whichever one of the adapter bushings of FIGS. 13a, 13b, and 13c in the adapter of FIG. 13 as may be required to fit the visor rod;

FIG. 15 shows the visor rod of FIG. 14 with the adapter of FIG. 13 applied thereto, and FIG. 16 shows the visor of FIG. 8 mounted on the assembly of FIG. 15.

Similar reference numerals are applied to corresponding parts throughout the views.

Referring first to FIGS. 1 to 3, the combination map holder and visor indicated generally by the reference numeral 17 is similar in size and shape generally and designed to replace the conventional sun visor inside an automobile behind and over the windshield. The same has the rectangular body 18 made of a plastic extrusion so that the curved upper and lower ends 19 can be formed directly in the extrusion at low cost, and these parts may be furnished in whatever length or lengths desired without any problem. The body 18 is of opaque plastic but the companion channel piece 20 of extruded plastic material of the same length, which is to serve as a flat support for a map like that indicated at 21 in FIG. 7, is translucent to permit good illumination of the map by means of small electric light bulbs 22 mounted in sockets 23 in the opposite ends of the map holder, thus making the device just as useful at night as during the daytime. Grooves 24 extending lengthwise of the extruded body 18 receive the edges of the insert 20 and the latter is suitably fused or cemented in place therein. Plugs 25 of plastic material are fused onto the inside of body 18 in the opposite ends and these plugs have longitudinal holes 26 provided therein which are tapped for threaded reception of screws 27 for fastening the metallic end pieces 28 onto the opposite ends of the body 18 with the end portions of the body 18 and map support 20 engaged in grooves 29 and 30, respectively, provided in the end pieces. This not only makes for a strong rigid construction but one in which expansion and contraction of the body 18 and map support 20 with temperature change will not noticeably affect the ease of operation of the map with the rollers 31 and 32 that are mounted in the upper and lower end portions of the unit. Otherwise, where the end pieces 23 are rigidly connected by through-bolts extending lengthwise of the device, the rollers are apt to work hard one time and work too freely another due to expansion and contraction of the long body parts with temperature change.

Elongated openings 33 are provided lengthwise of the end pieces 28 and annular recesses 34 are provided in the outer sides of these pieces around these openings in which elongated plates 35 are arranged to fit neatly, substantially flush with the outside as openable closures and as supports for the light sockets 23. A coiled tension spring 36 extending lengthwise of the device inside the same is stretched and has elongated opposite end portions 37 attached to terminal plates 38 to which the sockets 23 are affixed and to which a banana plug 39 on the end of an insulation covered wire 40 that leads to a switch on the dash or other convenient place in the car for connection with the car battery is electrically connected by means of a plug receptacle 41 in insulated relationship to the grounded central terminals 42 of the two light sockets, as indicated by the insulation 43 interposed between plates 35 and 38. Thus the spring 36 serves the double purpose of holding the plates 35 in place under spring tension and properly grounded on the end pieces 28, while holding the light bulbs 22 in their proper positions in the opposite ends of the device for good illumination of the map, and at the same time supplying the electrical connection between the ungrounded portions of the two light sockets 23. Plug receptacles 41 are provided on both plates 35 so that the battery connection 40 may be attached to either end of the device.

The two light sockets 23 and their battery connection 40 and switch on the dash may be omitted, along with the spring connection 36–38, by substituting the plates 35' for plates 35 in the manner illustrated in FIG. 4. Each of these plates 35' has an elongated tubular flashlight case 44 mounted thereon at one end so as to extend in spaced parallel relationship to the map support 20 and body member 18, the same carrying a light bulb 22' in a socket 23' provided on the screw-capped inner end. It is unnecessary to go into the details further, inasmuch as flashlights of this general type are well known. The switch button 45 for turning the light 22 on or off projects outside the plate 35' from the fixed end of the case 44. An elongated leaf spring 46 is secured to the inner side of plate 35' and has inwardly projecting curved end portions 47 which snap into place on the inner side of the opening 33 at the opposite ends thereof when the plate 35' is pressed inwardly. One can use the switch button 45 to pull the assembly out whenever the bulb 22' fails to light and one must determine whether the bulb is burned out or the dry cell battery in the flashlight case needs replacing.

The upper roller 31 is of tubular form with a plug 48 pressed in one end having a square axial hole 49 provided therein for slidable non-rotatable reception of a square stem 50, the inner end 51 of which has eyebrow projections formed thereon for abutment by one end of a coiled compression spring 52 that is caged on the stem in compressed condition between the plug 48 and projections 51. The outer end portion 53 of the stem 50 is of reduced cylindrical form and suitably secured in the center of a knob 54. A bushing 55 is threaded into a hole 56 provided in the one end piece 28, and this hole is of the same diameter and threaded the same as the hole 56' provided in the other end piece 28 in coaxial alignment with hole 56, in order to permit threading bushing 55 interchangeably in either of said holes. A square axial hole 57 is provided in bushing 55 of the same size as hole 49 in bushing 48. Thus, knob 54, which has its reduced cylindrical portion 58 normally entered with an easy turning fit in the enlarged outer end portion 59 of hole 56 (for which there is an equivalent enlargement 59' for hole 56' in the other end piece 28) so that the roller 31 does not depend for this end thereof being kept centered by bearing engagement of the reduced cylindrical portion 53 of stem 50 in the larger square bore 57 in bushing 55, may be pulled out so as to engage the square portion of stem 50 in the square bore 57, to enable unscrewing the bushing 55 whenever it is desired to change from a left hand mounting for the map holder, shown in FIGS. 1 and 8, to a right hand mounting shown in FIG. 7. It will be noticed in FIG. 7 that the knob 54 is on the left end of the unit and the combination adapter block receptacle bushing and roller support 60 is on the right end, whereas the latter is on the left end in FIGS. 1 and 8. In screwing the bushing 55 in place in either of holes 56 and 56', the square portion of stem 50 is used in the same way. Fiber washers are preferably provided in the assembly, as shown, on both sides of bushing 55 to make for smoother and easier operation of the roller.

The bushing 60 has an enlarged hex head outer end 61 for application of a wrench in tightening or unscrewing the same, and next to the head is a reduced cylindrical shank portion 58' corresponding to the reduced shank portion 58 of knob 54 which fits freely in the enlarged outer end portion 59' of hole 56', the inner reduced threaded end portion 55' of the bushing being adapted to thread interchangeably in either of the holes 56 and 56'. A further reduced smooth cylindrical shank portion 62 is provided on the inner end of the bushing 60 which enters freely in the adjacent end of the roller 31 as a bearing therefor. The bore 63 in the bushing 60 enables insertion therethrough of a pencil as a guide for the free end of roller 31 when assembling the roller onto the bearing 62 while threading bushing 60 into place, and it will soon appear how this bore also permits extension therethrough into the roller 31 of a visor support rod of the kind shown in FIGS. 14 and 15 at 64. The counterbore 65 in bushing 60 has an annular groove 66 provided therein and diametrically opposed notches 67 are provided in the outer end of the hex head 61 for cooperation with a snap ring 68 and connecting pin 69, respectively, on either of the two styles of adapter plugs 70 and 71 shown in FIGS. 9 and 13, as illustrated in FIGS. 12 and 16, respectively, whereby to permit snapping the map holder 17 in place on the visor mount after having temporarily removed the map holder for some reason, whether it be to remove one map and insert another or when the unit is to be used laid on the car seat or in the lap or even taken out of the car. In passing, it should, of course, be clear that roller 31 is operable in either direction by turning knob 54, and one end of the map is inserted in a slot 72 provided in the wall of the roller intermediate the ends thereof to provide an operating connection between the roller and map.

The lower roller 32 has identical knobs 73 mounted on its opposite ends by means of square stems 74 that have a sliding non-rotatable fit in bushings 75 pressed into the ends of the tubular body of the roller, there being a coiled compression spring 76 caged on each of these stems between the bushing 75 and the eyebrow projections 77 formed on the inner end of the stem, so that the knobs 73 are urged inwardly under spring pressure and their reduced cylindrical portions 78, when entered in sockets 79 provided therefor in the end pieces 28, are held frictionally in adjusted position. There is a fiber washer provided on each of the stems 74 for bearing engagement in the inner ends of the sockets 70 so that the roller 32 turns smoothly and easily. Arcuate slots 80 provided in the end pieces 28 open into the sockets 79 and hence when the knobs 73 are pulled outwardly clear of the sockets 79 the roller 32 can be removed, as when a greater length of the map 21 than is normally visible is to be checked, or when a new map is being inserted in the holder. A slot 81 is provided in the roller 32 to receive the other end of the map and thereby make connection with it for winding on the roller.

To facilitate map reading, I prefer to provide spring clips like those shown at 82 in FIGS. 5–7 adapted to be applied to the edge portions of the curved upper and lower ends 19 of the body member 18, as indicated in dotted lines in the lower portion of FIG. 3, that is, with the short arcuate leg 83 inside and the longer arcuate leg 84 outside, the longitudinally extending slot 85 serving as a marker when the clip is slid lengthwise of the map holder to a position in alignment with the end of a route line 86 appearing on the map. In this way, the user can read the map instantly by reference first to these markers where the route line is so easily picked up for a starting point.

Referring to FIGS. 9 to 12, the adapter plug 70 of FIG. 9 is arranged to be inserted in the bore 87 of the longitudinally split swivel elbow mounting 88 when the rod 64' to which the conventional visor 17a is rigidly secured for pivotal adjustment relative to its mounting is removed. It will be noticed that the rod 64' has an annular groove 89 in its supported end in register with the screw 90 provided for adjustably contracting the split portion of the elbow in which the bore 87 is provided while at the same time retaining the rod by engagement of the shank portion of the screw in the groove 89, the purpose of this screw adjustment being, of course, to enable tightening the screw when, due to wear between the parts, the visor does not stay up when raised to an out-of-the-way position. The supporting bracket 91 is arranged to be fastened by screws to the inside of the car body above the windshield. The adapter plug 70 has a shank portion 92 of the same diameter as rod 64' with a groove 89 provided therein at a corresponding location to groove 89 for the same cooperation with bore 87 and screw 90 in fitting 88, as seen in FIGS. 11 and 12. The other end portion 93 of the plug is adapted to fit in the bore 63 in bushing 60 (see FIG. 1) and, to facilitate entry in this bore, has its extremity tapered, as indicated at 94. Next to the shank portion 93 and intermediate the ends of the plug 70 is a concentric enlarged cylindrical portion 95 of approximately the same diameter as the shank portion 58' of bushing 60 and adapted therefore to fit neatly in the counterbore 65 in bushing 60. The snap ring 68 mounted in an annular groove in portion 95 of plug 70 is located so as to snap into groove 66 in bushing 60 at the same time that the radial pin projection 69 enters either one of the two diametrically opposed notches 67 in the head portion 61 of bushing 60. It should be clear, therefore, that the present map holder 17 can be substituted for the conventional visor 17a with very little difficulty, using the adapter plug 70, and this plug enables quick removal and replacement of the map holder besides affording all of the advantages that were enjoyed in the original visor installation.

Referring next to FIGS. 13 to 16, the adapter 71 is in the form of a hollow plug or bushing designed for use when substituting the present map holder 17 for that style of conventional visor shown at 17b in FIG. 14, wherein the body of the visor is pivotally mounted on the rod 64 which in turn has its upwardly bent right angle end portion 96 swivelled in the supporting bracket 97 that is arranged to be fastened by screws to the inside of the car body above the windshield, the visor body being adapted to be stripped off the rod 64 so that the rod with the adapter 71 applied thereto is then adapted to provide a mounting for the map holder 17, as shown in FIG. 16. The bore 63 in the bushing 60 is large enough to accommodate the largest diameter rod 64 presently in use on different cars. When the largest size rod is to be fitted, the adapter 71 is slipped over the end of the rod to a point near the inner end and is fastened by means of a set screw 98 provided in its enlarged end portion 99. The other end portion 95' is of slightly reduced diameter, being of the same diameter as the portion 95 of adapter plug 70, so as to fit neatly in the counterbore 65 of bushing 60 with the snap ring 68 carried in the annular groove therein arranged to snap into the annular groove 66 and with the radial pin projection 69 arranged to engage in either of the notches 67 in the hex head portion 61 of the bushing 60 to complete the assembly illustrated in FIG. 16. With this assembly, the map holder 17 is readily removable and replaceable the same as with the assembly of FIG. 12 and the only difference in operation is that the bushing 100, which is slipped into the counterbore 101 and has a snug fit on the rod 64, is designed to be compressed radially to a certain extent by the tightening of the set screw 98 to hug the rod 64 more or less tightly and thus allow the assembly to be turned on the rod 64 up or down freely enough but without danger of the map holder 17 tending to drop down when raised to an out-of-the-way position. For application to one smaller sized rod 64, a split bushing like that shown at 102 in FIG. 13a is provided, and for application to another smaller sized rod 64, another split bushing like that shown at 103 in FIG. 13b is provided. Either of these bushings may be inserted interchangeably in the adapter 71 with the enlarged end fitting in the counterbore 101, so that tightening of the set screw 98 serves to compress the bushing to hug the rod more or less tightly. In that way the map holder 17 may be applied to any one of three different sizes of rods 64 to equal advantage.

It is believed the foregoing description conveys a good understanding of the objects and advantages of my invention. The appended claims have been drawn to cover all legitimate modifications and adaptations.

I claim:

1. In a device of the character described comprising a casing, and a roller of elongated form mounted for rotation at its ends in said casing adapted to be turned manually, knob-operated means connected with one end of said roller for manually turning the same in either direction, said roller being hollow and open axially thereof at the other end, whereby it is adapted to receive supporting means for the casing inserted in the open end of the roller, an elongated rod insertable in the open end of said roller and closely engageable in said roller for pivotal support of said casing on said rod, a swivel mounting for the outer end of said rod whereby said casing when mounted on the rod is universally adjustable therewith, and means for detachably securing said casing against endwise displacement from said rod.

2. A device as set forth in claim 1, including a bushing removably insertable in said casing in either of two coaxial holes provided in said casing at remote ends thereof to serve as a bearing support for one end of said hollow roller destined to be the open end thereof when disposed with that end at either end of said casing, whereby to enable use of the device for either right or left hand use.

3. A device as set forth in claim 1, including a bushing removably insertable in said casing in either of two coaxial holes provided in said casing at remote ends thereof to serve as a bearing support for one end of said hollow roller destined to be the open end thereof when disposed with that end at either end of said casing, whereby to enable use of the device for either right or left hand use, the means for detachably securing said casing against endwise displacement from said rod having detachable connection with said bushing, whereby said device may be removed from and replaced on said rod.

4. A device as set forth in claim 1, including a bushing removably insertable in said casing in either of two coaxial holes provided in said casing at remote ends thereof to serve as a bearing support for one end of said hollow roller destined to be the open end thereof when disposed with that end at either end of said casing, whereby to enable use of the device for either right or left hand use, the device including an adapter sleeve member adapted to be assembled over said rod next to the right angle end, said sleeve having one end fitting in and detachably connected with said bushing, and a screw threaded through a radial hole in the other end portion of said sleeve and tightenable toward said rod.

5. A device as set forth in claim 1, including a bushing removably insertable in said casing in either of two coaxial holes provided in said casing at remote ends thereof to serve as a bearing support for one end of said hollow roller destined to be the open end thereof when disposed with that end at either end of said casing, whereby to enable use of the device for either right or left hand use, the device including a sleeve in telescoping relation inside said adapter sleeve fitting closely on said rod and arranged to be compressed by tightening of said screw to grip said rod more or less tightly depending on the degree of tightening of said screw.

6. In a device of the character described comprising a casing, and a roller of elongated form mounted for rotation at its ends in said casing adapted to be turned manually, knob-operated means connected with one end each of said rollers for manually turning the same in either direction, said roller having a casing supporting coaxial rod extension on the other end thereof adapted to be received in casing supporting means, an elbow member one leg of which is hollow and split lengthwise and receives said supporting rod extension therein for support of the casing, and an adjustable screw for compressing said hollow split leg for connection with said supporting rod extension and for pivotal support of said casing on said elbow, the other leg of said elbow being carried in a swivel mounting whereby said casing when mounted on said elbow is universally adjustable.

7. A device as set forth in claim 6 wherein said roller is adapted to be reversed end for end in said casing so that the supporting rod extension is on the right or left hand side of said casing, whereby to enable use of the device for either right or left hand use.

8. A device as set forth in claim 6 wherein said roller is hollow, and said device includes a bushing removably insertable in said casing in either of two coaxial holes at remote ends of said casing to serve as a bearing support for one end of said hollow roller when disposed with that end at either end of said casing, whereby to enable use of the device for either right or left hand use, the supporting rod extension comprising an adapter rod element having one end portion closely engageable in the bushing and roller for support of the device and having the other end portion extending from the device and entered in the hollow split leg of said elbow member.

9. A device as set forth in claim 6 wherein said roller is hollow, and said device includes a bushing removably insertable in said casing in either of two coaxial holes at remote ends of said casing to serve as a bearing support for one end of said hollow roller when disposed with that end at either end of said casing, whereby to enable use of the device for either right or left hand use, the supporting rod extension comprising an adapter rod element having one end portion closely engageable in the bushing and roller for support of the device and having the other end portion extending from the device and entered in the hollow split leg of said elbow member, the device including means having detachable connection with said bushing for detachably securing said casing against endwise displacement from said adapter rod element, whereby said device is removable and replaceable relative to said elbow member.

10. In a device of the character described comprising a casing, and a roller of elongated form mounted for rotation at its ends in said casing adapted to be turned manually, knob-operated means connected with one end of said roller for manually turning the same in either direction, there being identical coaxial holes in the opposite ends of said casing adjacent the opposite ends of said roller, a swivel mounting, means adapted to be assembled in either of said holes to provide bearing support on the one hand for one end of said roller and connectible on the other hand for support of said casing with the swivel mounting, and means forming a part of the aforesaid knob-operated means for said roller for supporting the other end thereof in the casing and adapted to be assembled in either of said holes, said roller being reversible end for end with respect to said casing whereby to enable connection of either the right or left hand end of said casing with the swivel mounting.

11. A device as set forth in claim 10 wherein the identical coaxial holes in said casing are threaded and have smooth enlarged counterbores in the outer ends thereof, the first mentioned means for bearing support of one end of the reversible roller and connection with the swivel mounting comprising a plug threadable in either of said holes and having an enlarged smooth outer end portion engageable in the counterbore to limit inward threading, the other means providing bearing support for the other end of said roller also comprising a plug threadable in either hole having an enlarged outer end portion engageable in the counterbore to limit inward threading, and the knob-operated means for turning the latter end of said roller comprising a knob having a reduced smooth shank portion received with a bearing fit in the counterbore in the hole, said knob having a stem extending through a polygonal shaped bore provided in the last mentioned plug and having a polygonal shaped bore provided in the adjacent end of said roller, whereby said knob is adapted to be used as a wrench in screwing the last mentioned plug in or out by entry of the polygonal shaped portion of said stem in the polygonal shaped bore in said plug.

12. A device as set forth in claim 10 wherein the identical coaxial holes in said casing are threaded and have smooth enlarged counterbores in the outer ends thereof, the first mentioned means for bearing support of one end of the reversible roller and connection with the swivel mounting comprising a plug threadable in either of said holes and having an enlarged smooth outer end portion engageable in the counterbore to limit inward threading, the other means providing bearing support for the other end of said roller also comprising a plug threadable in either hole having an enlarged outer end portion engageable in the counterbore to limit inward threading, and the knob-operated means for turning the latter end of said roller comprising a knob having a reduced smooth shank portion received with a bearing fit in the counterbore in the hole, said knob having a stem extending through a polygonal shaped bore provided in the last mentioned plug and having a polygonal shaped bore provided in the adjacent end of said roller, whereby said knob is adapted to be used as a wrench in screwing the last mentioned plug in or out by entry of the polygonal shaped portion of said stem in the polygonal shaped bore in said plug, and spring means in said roller normally urging said stem inwardly into said roller.

13. In a device of the character described comprising a casing of generally rectangular form, and rollers of elongated form mounted for rotation at their ends on substantially parallel axes in the opposite end portions of said casing adapted to be turned manually to wind roll material such as a roll map from one roller onto the other, and vice versa, knob-operated means connected with the ends of said rollers for manually turning the same in either direction, a translucent map support in said casing between said rollers, there being openings provided in the opposite ends of said casing, closure plates removably engageable over said openings each carrying an electric light socket on the inner side thereof adapted to receive an electric light bulb for illumination of a map engaging said translucent support, spring means stretched between and interconnecting said plates inside said casing holding the plates in place resiliently while permitting removal of either plate for inspection or replacement of the light bulb, said spring means also electrically connecting the ungrounded side of said light sockets, the other side of said sockets being grounded, and electric current supply means electrically connected with the ungrounded side of said sockets.

14. In a device of the character described comprising a casing of generally rectangular form, and rollers of elongated form mounted for rotation at their ends on substantially parallel axes in the opposite end portions of said casing adapted to be turned manually to wind roll material such as a roll map from one roller onto the other, and vice versa, knob-operated means connected with the ends of said rollers for manually turning the same in either direction, a translucent map support in said casing between said rollers, there being openings provided in the opposite ends of said casing, closure plates removably engageable over said openings each carrying a flashlight assembly on the inner side thereof for illumination of a map engaging said translucent support, each flashlight having a switch operable manually from the outer side of the plate to turn the light on or off, and means for detachably securing said plates in place closing said openings, whereby either of said plates may be removed independently of the other for inspection or replacement of a battery or light bulb.

15. In a device of the character described comprising a casing of generally rectangular form, and rollers of elongated form mounted for rotation at their ends on substantially parallel axes in the opposite end portions of said casing adapted to be turned manually to wind roll material such as a roll map from one roller onto the other, and vice versa, knob-operated means connected with the ends of said rollers for manually turning the same in either direction, and a route marker slidably adjustable lengthwise of at least one end portion of said casing relative to a roll map wound on said rollers to designate start and finish points of a span of a selected route on the map, said route marker comprising a leaf spring clip that is generally U-shaped in longitudinal section and adapted to straddle the end portion of the casing while the end portions of the clip have slidable frictional engagement on the inner and outer sides of said end portion, the middle portion of the clip carrying a pointer directed toward the map.

16. In a device of the character described comprising a casing of generally rectangular form, and rollers of elongated form mounted for rotation at their ends on substantially parallel axes in the opposite end portions of said casing adapted to be turned manually to wind roll material such as a roll map from one roller onto the other, and vice versa, knob-operated means connected with the ends of said rollers for manually turning the same in either direction, and a route marker slidably adjustable lengthwise of at least one end portion of said casing relative to a roll map wound on said rollers to designate start and finish points of a span of a selected route on the map, said route marker comprising a leaf spring clip that is generally U-shaped in longitudinal section and adapted to straddle the end portion of the casing while the end portions of the clip have slidable frictional engagement on the inner and outer sides of said end portion, the middle portion of the clip having a slot extending longitudinally of the clip to serve as a pointer when in register with a route line on the map.

17. In a device of the character described comprising a casing of generally rectangular form, and rollers of elongated form mounted for rotation at their ends on substantially parallel axes in the opposite end portions of said casing adapted to be turned manually to wind roll material such as a roll map from one roller onto the other, and vice versa, knob-operated means connected with the ends of said rollers for manually turning the same in either direction, said casing comprising an elongated main body member that is of channel shaped cross-section at the top and bottom portions wherein the rollers are received, a map support of elongated form mounted on said body member between said rollers, two opposed end members adapted to be secured onto the opposite ends of said body member closing the opposite ends of the channel shaped top and bottom portions, projections on the inner side of and rigid with said body member at its opposite ends to which connection may be made from the end members, and screws extending from the end members and threaded in said projections, whereby each of said end members is secured to said body member independently of the other end member, so that expansion and contraction of said elongated body member does not affect the freedom of operation of said rollers.

18. A device of the character described comprising a casing of generally rectangular form, and rollers of elongated form mounted for rotation at their ends on substantially parallel axes in the opposite end portions of said casing adapted to be turned manually to wind and unwind roll material from one roller onto the other, and vice versa, the improvement which consists in providing in connection with one of said rollers a bearing for one end of said roller, a plug threadable in a hole provided in said casing in coaxial relation with the other end of said roller having a polygonal axial bore provided therein, and a knob having a stem extending through said bore having a polygonal shaped inner end portion slidably but non-rotatably received in a polygonal shaped bore provided in the adjacent end of said roller, whereby said knob is adapted to be used as a wrench in screwing said plug in or out by entry of the polygonal shaped portion of said stem in the polygonal shaped bore in said plug.

19. A device of the character described comprising a casing of generally rectangular form, and rollers of elongated form mounted for rotation at their ends on substantially parallel axes in the opposite end portions of said casing adapted to be turned manually to wind and unwind roll material from one roller onto the other, and vice versa, the improvement which consists in providing in connection with one of said rollers a bearing for one end of said roller, a plug threadable in a hole provided in said casing in coaxial relation with the other end of said roller having a polygonal axial bore provided therein, a knob having a stem extending through said bore having a polygonal shaped inner end portion slidably but non-rotatably received in a polygonal shaped bore provided in the adjacent end of said roller, whereby said knob is adapted to be used as a wrench in screwing said plug in or out by entry of the polygonal shaped portion of said stem in the polygonal shaped bore in said plug, and spring means in said roller normally urging said stem inwardly into said roller.

20. In a device of the character described comprising a casing of generally rectangular form, and rollers of elongated form mounted for rotation at their ends on substantially parallel axes in the opposite end portions of said casing adapted to be turned manually to wind roll material such as a roll map from one roller onto the other, and vice versa, knob-operated means connected with the ends of said rollers for manually turning the same in either direction, a translucent map support in said casing between said rollers, there being an opening in said casing between the ends of said rollers, a closure plate removably engageable over said opening carrying an electric light socket on the inner side thereof adapted to receive an electric light bulb for illumination of a map engaging said translucent support, spring means inside said casing connected with said plate and holding it in place resiliently while permitting removal of the plate for inspection or replacement of the light bulb, said spring means also electrically connecting the ungrounded side of the light socket, the other side of the socket being grounded, and electric current supply means electrically connected with the ungrounded side of said socket.

21. In a device of the character described comprising a casing of generally rectangular form, and rollers of elongated form mounted for rotation at their ends on substantially parallel axes in the opposite end portions of said casing adapted to be turned manually to wind roll material such as a roll map from one roller onto the other, and vice versa, knob-operated means connected with the ends of said rollers for manually turning the same in either direction, a translucent map support in said casing between said rollers, there being an opening in said casing between the ends of said rollers, a closure plate removably engageable over said opening carrying a flash light assembly on the inner side thereof for illumination of a map engaging said translucent support, the flash light having a switch operable manually from the outer side of the plate to turn the light on or off, and means for detachably securing said plate in place closing said opening, whereby the plate may be removed for inspection or replacement of a battery or light bulb.

References Cited in the file of this patent

UNITED STATES PATENTS

| | | |
|---|---|---|
| 1,667,967 | Crimmins | May 1, 1928 |
| 1,684,682 | Prettyman | Sept. 18, 1928 |
| 1,814,690 | Haack | July 14, 1931 |
| 2,153,095 | McKinley | Apr. 4, 1939 |
| 2,306,634 | MacDonald | Dec. 29, 1942 |
| 2,563,580 | Clark | Aug. 7, 1951 |
| 2,591,844 | Macripo | Apr. 8, 1952 |
| 2,625,426 | Weymouth | Jan. 13, 1953 |
| 2,657,487 | Sprung | Nov. 3, 1953 |
| 2,721,409 | Bland | Oct. 25, 1955 |
| 2,787,070 | Idoine | Apr. 2, 1957 |
| 2,853,817 | Palm | Sept. 30, 1958 |

FOREIGN PATENTS

| | | |
|---|---|---|
| 591,134 | Great Britain | Aug. 8, 1947 |

UNITED STATES PATENT OFFICE
CERTIFICATE OF CORRECTION

Patent No. 3,003,270                                October 10, 1961

John R. Palm

It is hereby certified that error appears in the above numbered patent requiring correction and that the said Letters Patent should read as corrected below.

Column 7, line 25, for "each of said rollers" read -- of said roller --.

Signed and sealed this 17th day of April 1962.

(SEAL)
Attest:

ESTON G. JOHNSON

Attesting Officer

DAVID L. LADD

Commissioner of Patents